United States Patent [19]

Sandhu

[11] Patent Number: 4,651,567
[45] Date of Patent: Mar. 24, 1987

[54] NON-COHERENT FREQUENCY SOURCE AND SECTOR SCANNING APPARATUS FOR ULTRASONIC IMAGING SYSTEM USING A LIQUID CRYSTAL DETECTOR CELL

[75] Inventor: Jaswinder S. Sandhu, Chicago, Ill.

[73] Assignee: Raj Technology, Inc., Chicago, Ill.

[21] Appl. No.: 776,012

[22] Filed: Sep. 13, 1985

[51] Int. Cl.$^4$ ............................................. G01N 29/04
[52] U.S. Cl. ..................................... 73/603; 73/621; 73/606; 367/7; 350/330
[58] Field of Search ................. 73/603, 606, 621, 633, 73/634; 367/7; 350/330

[56] References Cited
U.S. PATENT DOCUMENTS

| | | | |
|---|---|---|---|
| 4,338,821 | 7/1982 | Dion | 73/603 |
| 4,379,408 | 4/1983 | Sandhu | 73/603 |
| 4,506,550 | 3/1985 | Sandhu | 73/603 |
| 4,530,242 | 7/1985 | Sandhu | 73/603 |

Primary Examiner—Howard A. Birmiel
Attorney, Agent, or Firm—Hill, Van Santen, Steadman & Simpson

[57] ABSTRACT

There is disclosed herein an ultrasonic imaging system using a liquid crystal detector cell and a source of non-coherent acoustic energy to produce substantially artifact-free images. The ultrasound source and cell are matched with one another, and the source is caused to operate over a range of frequencies or phases so as to produce the non-coherent ultrasonic energy. The frequency response of the cell and its response time are matched to the operating characteristics of the transducer. The transducer may be mounted in a pendulum-like sector scanning apparatus so as to assure a uniform insonification of the object, a uniform beam and a substantially uniform non-coherent insonification of the cell. The movement of the scanning apparatus is also matched to the cell and the transducer characteristics.

11 Claims, 3 Drawing Figures

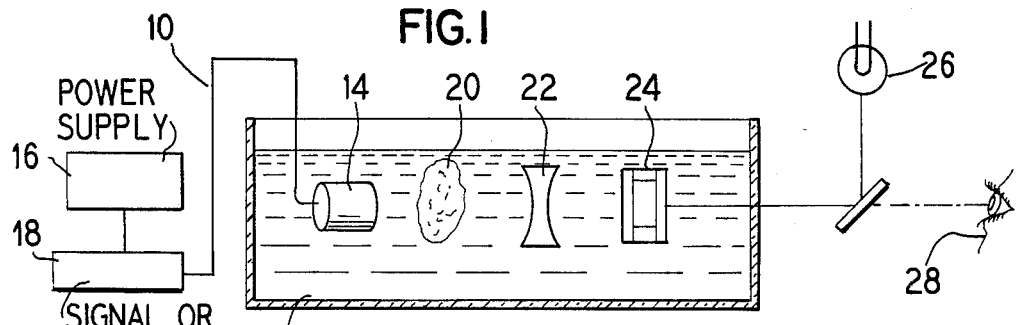
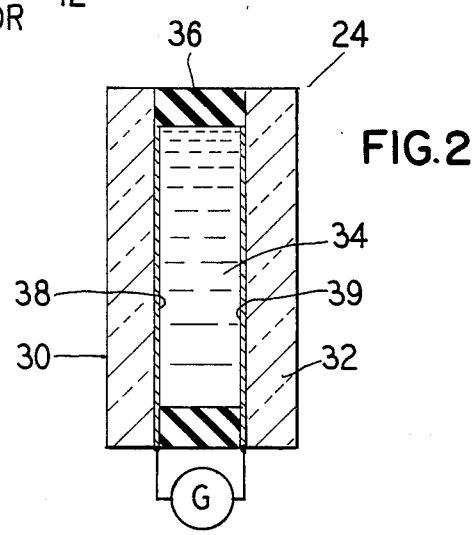
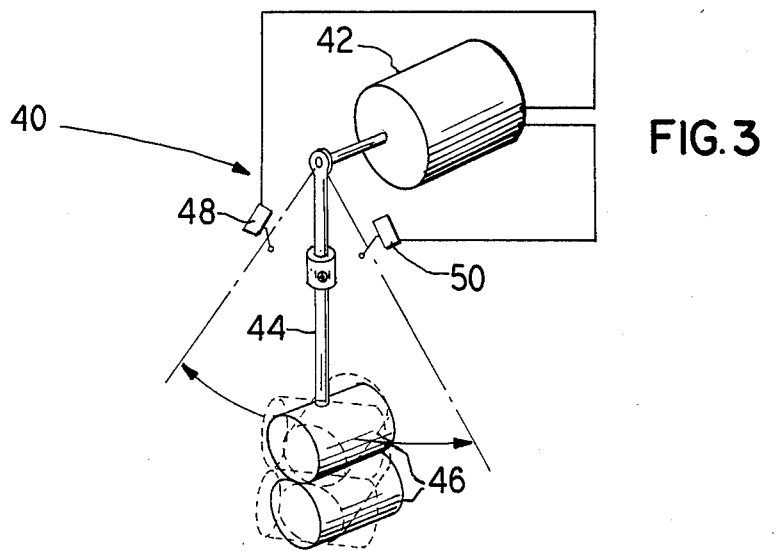

NON-COHERENT FREQUENCY SOURCE AND SECTOR SCANNING APPARATUS FOR ULTRASONIC IMAGING SYSTEM USING A LIQUID CRYSTAL DETECTOR CELL

BACKGROUND OF THE INVENTION

This invention relates to the general field of acoustic imaging, and in particular, to a system which includes a liquid crystal detector cell and improved ultrasound source for enhancing image quality.

The use of ultrasonics to nondestructively and noninvasively inspect objects for internal discontinuities, irregular shapes, etc., is well known in the industrial and medical fields. In one form, ultrasonic imaging is accomplished by using electronic displays in which the ultrasonic signal is electronically detected and enhanced. In another form, the ultrasonic image is proposed to be detected and displayed using an ultrasonic transducer to insonify the object to be inspected and a liquid crystal cell to detect ultrasonic energy from the insonified object. The liquid crystal cell includes a pair of cover plates between which a layer of liquid crystal material is encapsulated. See, Greguss, U.S. Pat. No. 3,831,434 and Dion, U.S. Pat. No. 4,338,821 for examples of such proposed transducers and cells.

In such systems the ultrasonic transducer produces a coherent ultrasonic signal and the images may have defects due to the coherence of the ultrasound. With such coherent ultrasound, the defects may be produced by phase cancellations and phase reinforcements. These image defects are sometimes referred to as image artifacts. Speckle and ringing are common artifacts. "Speckle" refers to randomly positioned variations in image intensity due to phase cancellations and reinforcements. "Ringing" refers to systematic variations, due to phase cancellation and reinforcement, and which usually appear as fringes in the images.

These artifacts can be minimized by reducing ultrasonic wave coherence. Dion, U.S. Pat. No. 4,338,821 suggests reducing coherence by phase shifting through the pivoting movement of the acoustic transducer or by frequency sweeping between fixed limits which results in the superimposing of images from all frequencies swept, as suggested by previous art.

However, to applicant's knowledge, the Dion system has not produced a high-quality, substantially artifact-free image on a liquid crystal detector cell.

Another approach to producing non-coherent or incoherent ultrasonic energy was suggested in "Spatially and Temporally Varying Insonification for the Elimination of Spurious Details in Acoustic Transmission Imaging", by J. F. Havlice, et al, *Acoustical Holography*, Vol. 7, page 291–305 (1977), which suggested an array of twenty-five single ultrasonic sources, which are turned on independently and the final incoherent image is the summation of twenty-five single exposures. This approach is slow and requires a considerable electronic outlay.

Another approach was suggested in "Coherence and Noise in Ultrasonic Transmission Imaging" by Roder et al, *Ultrasonics*, November 1980, page 273–276. There a chamber was filled with water and polystyrene cylinders whose dimensions are about the wavelength of the ultrasound. Turbulent flow of the water was caused and ultrasound was directed into the chamber. Ultrasound exiting the object is to be detected by a small water tank which is in contact with a larger coupling water tank. The physical arrangement of this system has a number of disadvantages, including vibration which can render image detection more difficult, the dector can only be used in a horizontal position, convenience, the need for a Schlieren optical system for image viewing, etc. See also "Acoustic Image with Holography and Lenses", by Glenn Wade, *IEEE Transaction*, November 1975, page 385, et seq.

None of these non-coherent ultrasound generating systems are known to produce acceptable substantially artifact-free acoustic images in a liquid crystal cell detector.

It is therefore an object of this invention to provide a convenient source of non-coherent or incoherent ultrasonic energy for producing a substantially artifact-free image on a liquid crystal cell detector.

This and other objects will become apparent from the following description and appended claims.

SUMMARY OF THE INVENTION

There is provided by this invention an ultrasonic imaging system using a liquid crystal detector cell and a source of non-coherent acoustic energy, which produces substantially artifact-free images. In this system the operation of the ultrasound source and the cell are matched with each other. The source is an ultrasonic transducer which is caused to operate over a range of frequencies or phases so as to produce the non-coherent ultrasonic energy. In general the frequency response of the cell (i.e., acoustic transparency) and its response time (i.e., rise or decay time) are matched to the operating characteristics of the transducer element.

The transducer may be mounted in a pendulum-like sector scanning apparatus so as to assure uniform insonification of the object (particularly larger objects), a uniform beam, and thus substantially uniform non-coherent insonification of the cell. The movement of the scanning apparatus is also matched to the cell and the transducer characteristics.

In general, the frequency and/or phase of the ultrasound is varied, and the rate of variation or scanning is faster than the cell response time, so as to also produce an artifact-free image (i.e., an image substantially free of ringing and speckle). There is no maximum scanning rate, although some rates may be so fast that the cell will not react instantaneously but an artifact-free image will still be produced, since the cell responds to averaged intensity.

When frequency shifting, a central operating frequency is chosen in relation to the thickness of the cell covers on the basis that the cell cover conforms to the $n\lambda/2$ condition so as to assure good acoustic transmission (where n is an integer 1, 2, 3, . . . ; and $\lambda$ is the wavelength of the ultrasonic energy) The frequency is then varied about the central frequency, over a range where the limits are defined by unacceptable losses in acoustic transmission. In other words, the frequencies selected assure good acoustic transmission. The rate of frequency variation or scanning is governed by the response time of the liquid crystal cell. The minimum or slowest rate of frequency variation or scanning is limited by the response time of the cell and the visual perception of a continuous image by the human eye. The visual images should not appear to flicker to the human eye, and the cell should not produce any artifacts, which could happen if the scanning rate was slower than the response time. There is no theoretical limit for the maximum (i.e., fastest) scanning rate, although practical limits may be reached.

When using phase shifting (i.e., the change in phase of the ultrasonic signal with time), the frequency is selected according to the $n\lambda/2$ condition, and the rate of change of phase is governed by the cell response time and the flicker conditions as set forth above. The phase variation itself is selectable between 0°–360°.

The frequency and phase variations are produced by electronic signal or function generators.

BRIEF DESCRIPTION OF THE DRAWINGS

FIG. 1 is a diagrammatic view of an ultrasonic imaging system which employs frequency or phase variation to produce a non-coherent ultrasonic energy and a substantially artifact-free image;

FIG. 2 is a cross-sectional view of a liquid crystal imaging cell; and

FIG. 3 is a schematic view of the sector scanning apparatus.

DESCRIPTION OF THE PREFERRED EMBODIMENT

I. In General

In referring now to FIG. 1, a form of an ultrasonic imaging system 10 is shown. The system includes a bath 12, usually water, and an ultrasound source 14 (acoustic transducer) that is driven by a power supply 16, and a signal or function generator 18. Transducer 14 directs an ultrasonic or acoustic beam toward the body or object 20, which is to be inspected, so as to insonify the body. The object or body is to be examined for an internal defect or feature.

In the transmission mode, an image-carrying ultrasonic beam exits the body 20 with information concerning the internal structure, and that beam may be focused with an acoustic lens system 22, on to the liquid crystal detector cell 24 so as to form an acoustic image. The interaction of the acoustic imaging beam with the liquid crystal material produces an image of the interior of the inspected body.

In order to assure proper viewing, the cell 24 is illuminated using an optical system, such as 26, which includes a light source, half-silvered mirror, appropriate lenses and crossed-polarizers (not herein specifically shown) which enables the viewer 28 to see the image of the inspected body 20. The transducer 14, object 20 and cell 24 are acoustically coupled to each other, usually by a water bath 12; however, other coupling media may be used and contact coupling rather than immersion may be employed. Furthermore, while only the acoustic transmission mode is shown, the system can also be used in an acoustic reflection mode to receive signals reflected from the interior of a body. The choice of transmission or reflection depends upon the specific situation. The cells disclosed herein can be used in either the transmission or reflection modes.

As seen in FIG. 2, the liquid crystal cell 24 includes a pair of substantially acoustically transparent cover members or substrates 30 and 32, at least one of which is also optically transparent. A thin layer of liquid crystal material 34 is encapsulated between the cover members, by the peripheral seal or spacer 36. Many different liquid crystal materials can be used, and the specific material will depend upon the particular use to which the cell will be put. However, liquid crystal materials, such as nematic, twisted nematic, nematic/cholesteric mixtures, guest-host or smectics can be used.

In the cell 24 the cover member 32 forms the optically transparent side or viewing side, and the other cover 30 forms the imaging beam-receiving side.

Furthermore, image enhancement and alignment techniques which employ the applicaton of a surfactant, such as lecithin, to the cell cover inner surfaces and the use of electric field alignment using thin film electrodes, such as 38 and 39, on either side of the liquid crystal layer can be used.

The specific cell used herein included a pair of $2'' \times 2'' \times .028''$ glass cover plates 30 and 32, which are treated with lecithin and an encapsulated layer of nematic liquid crystal material. Typical nematic liquid crystal materials include MBBA (methodybenzenladene-p-n'-butylaniline) and K-15 (4-cyano-4'-N-pentyl biphenyl).

Sandhu, U.S. Pat. No. 4,379,408, discloses a liquid crystal cell and ultrasonic inspection system of the general type described and by reference thereto the disclosure of Sandhu is incorporated herein.

The sector scanning apparatus 40 is shown in FIG. 3 and is a pendulum-type device for swinging a transducer through an arc of a circle. The apparatus includes a reversible motor 42 from which a support shaft 44 is suspended. Ultrasonic transducers, such as 46, are carried at the lower end of the shaft and are swung through an arc by the motor 42. The limits of the arc are fixed by limit switches such as 48 and 50, which are set for engagement by the support arm and which reverse the operation of motor 42. The size or extent of the arc is governed by the size of the object to be insonified and the arc is set so as to maximize uniform insonification of the object.

Furthermore, the transducers may be pivotally mounted on the support arm so as to be pivotable relative to the plane of the pendulum. Thus if it is desirable to provide an angular tilt, of say five or ten degrees, of the transducer axis relative to the plane of the pendulum, in order to enhance image quality, such can be provided.

Frequency Shifting

Turning now to the techniques for producing a non-coherent sound source by frequency shifting, the thickness of the cell covers were selected to maximize acoustic transparency, and in accordance with the $n\lambda/2$ condition for the transducer to be used. In one specific case, using $n\lambda/2$ (where $n=1$) to assure acoustic transparency, minimization of reflections, etc., and for a cell having a 0.028 thick cover, a central frequency of 3.5 megahertz was used. Next, the range of 0.5 frequency variation was selected. Here the variation is ±0.5 megahertz, which indicates the range over which good acoustic transparency is obtained. The limits of frequency variation range are defined by unacceptable losses in arc transmissions; which may result in deterioration of image quality by factors such as flicker, loss of object penetrating power, etc. Using a glass cell cover the range of frequency variation is limited by a loss of less than 20% of the acoustic transmission.

The rate of frequency variation or shifting was then selected. This rate is limited by the rate of visual flicker and the response time of the cell. The response time (i.e., the retention time for an image to remain on the cell without substantial decay) of this cell is about twenty seconds. As an optimum, a scanning rate of one second was chosen. Ultrasonic sound sources operating with these parameters can be obtained using an electronic signal or function generator.

The transducer was mounted to a sector scanning apparatus which scanned the object in three to four seconds. This combined procedure produced a substantially artifact-free image.

A system as described can be thought of as producing a series of separate images, one for each frequency which, when visually added together, form an artifact-free image. Samples have been insonified using the described cell, an ultrasonic source operating at 3.5±0.5 megahertz scanning for one second with a sector scanning apparatus and have produced substantially artifact-free images.

Variations on the specific condition disclosed herein are dependent on the transducer frequency and cell cover match meeting the nλ/2 condition, a frequency variation dependent on acoustic transmission losses, and a scanning rate faster than the cell response time to produce an artifact-free and flicker-free image.

Phase Shifting

Another technique for producing non-coherent ultrasonic energy is by phase shifting. Here the central frequency is selected in accord with the nλ/2 condition. The range of phase shifting can be selected between 0°-360°. The rate of phase shifting or scanning is governed as described above by the response time of the cell and image flicker. In a specific example, the cell 2"×2"×0.28" of FIG. 2 was used with a central frequency of 3.5 megahertz, a phase variation of 0°-360°, and a scanning rate of one second. The sector scanning apparatus of FIG. 3 was used with a three to four seconds scan time. This produced a suitable artifact-free image.

Acceptable variations in the technique and cell operating parameters are based on the transducer and cell matching. This includes selection of the central frequency based on nλ/2, phase shifting of 0°-360° or less, and a scanning time less than the response rate and flicker rate.

In the example given above, the phase shifting and scanning was produced electronically using an electronic signal or function generator.

It will be appreciated that numerous changes and modifications can be made to the embodiments disclosed herein without departing from the spirit and scope of this invention.

I claim as my invention:

1. A system for use in ultrasonic imaging to minimize the effects of ultrasound coherence in the image of an object to be inspected, said system including a source of non-coherent ultrasonic energy for insonifying the object to be inspected, which includes means for selectively scanning a predetermined range of ultrasonic frequencies or phases, a liquid crystal detector cell for receiving non-coherent ultrasonic energy from an object being inspected and forming an image, said cell including a pair of substantially acoustically transparent covers, a liquid crystal material disposed between said covers, and seal means for sealing the covers together and encapsulating the liquid crystal material therebetween, said cell exhibiting an image response time related to the time an image is retained on said cell, wherein the improvement comprises:

the rate of selective scanning being faster than the response time of the cell so as to produce a substantially artifact-free image and flicker-free image; and there being provided means for moving said noncoherent ultrasound source in a manner and at a rate to uniformly insonify an object to be inspected.

2. A system as in claim 1, wherein said noncoherent ultrasound source is produced by frequency shifting, the central frequency being selected in accordance with the nλ/2 condition for cover acoustic transparency, the range of frequency scanning being selected so as to asssure the acceptable acoustic transmission over the frequency range and the rate of frequency scanning being faster than the image response time so as to assure an artifact-free and visual flicker-free image.

3. A system as in claim 2, wherein said central frequency is about 3.5 megahertz, the frequency scanning is ±0.5 megahertz, the frequency scanning rate is about one second, the cell cover is glass and about 0.028 inches thick and the source of ultrasonic energy is moved along a predetermined path at a rate of about 4 seconds per cycle.

4. A system as in claim 3, wherein electronic means are provided for frequency scanning.

5. A system as in claim 1, wherein said non-coherent ultrasound source is provided by phase shifting, the central frequency being selected in accordance with the nλ/2 condition for cover acoustic transparency, the range of phase variation being less than about 0°-360°, and the rate of phase scanning being faster than the image response time so as to assure a substantially artifact-free and flicker-free image.

6. A system as in claim 5, wherein the central frequency is about 3.5 megahertz, the phase variation is between 0°-360°, the phase scanning rate is about one second, the cell cover is about 0.028 inches thick; and the source of ultrasonic energy is moved along a predetermined path at the rate of about 4 seconds per cycle.

7. A system as in claim 6, wherein electronic means are provided for said phase scanning.

8. A system as in claim 1 wherein said means for moving said ultrasound source comprises a sector scanning apparatus for moving said source through an arc of a circle.

9. A system as in claim 8, wherein said sector scanning means comprises:
reversible motor means;
support means suspended from said motor means for pendulum-like movement through an arc of a circle, said non-coherent transducer means secured to said support means distal the connection thereof to said motor means; and
limit switch means for engagement with said support means when said support means reaches the ends of its travel and said switch means being operatively associated with said motor means for causing said motor to reverse when said support means engages said limit switch means.

10. An apparatus as in claim 9, wherein said support means moves through an arc effective to substantially and uniformly insonify the object to be inspected with non-coherent ultrasonic energy and at a rate faster than the response time of said cell.

11. An apparatus as in claim 9 wherein said transducer is pivotally secured to said support means for angular positioning relative to the plane of movement of said support means.

* * * * *